March 18, 1947.   P. J. WALSH   2,417,622
CONVERTER SYSTEM
Filed Oct. 25, 1943
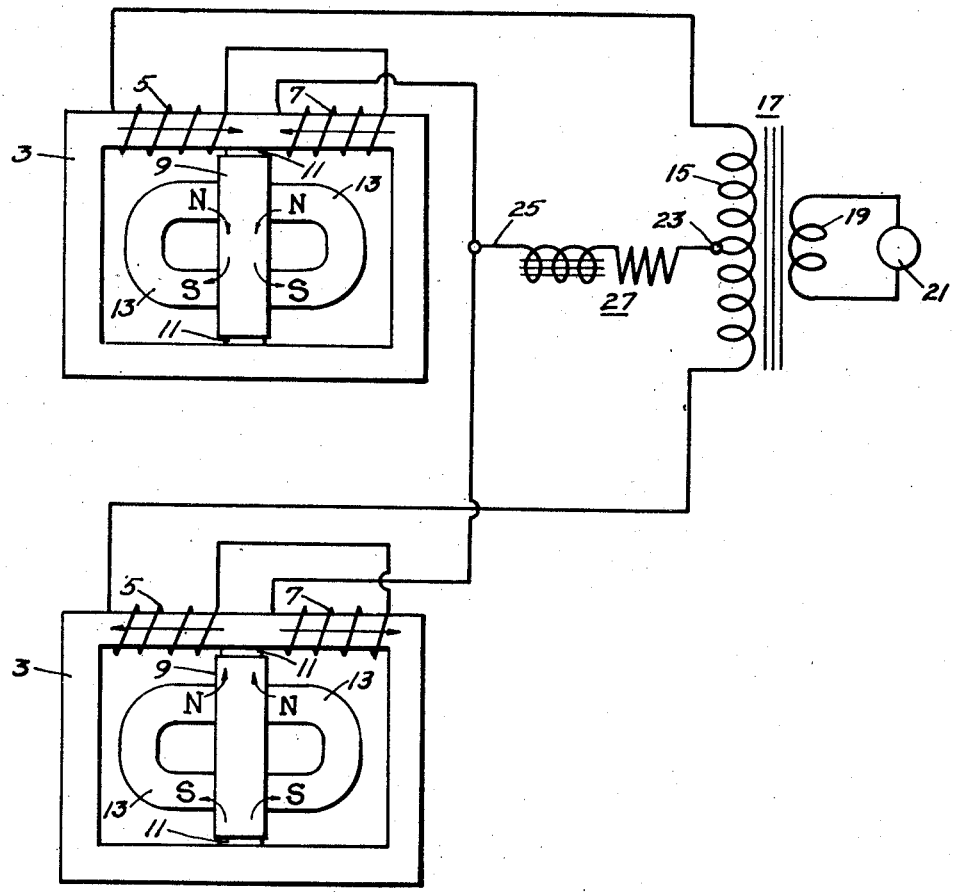
Inventor
*PHILIP JOHN WALSH*
By
*Lippincott + Metcalf*
Attorney Patented Mar. 18, 1947

2,417,622

UNITED STATES PATENT OFFICE 2,417,622

CONVERTER SYSTEM

Philip John Walsh, San Francisco, Calif.

Application October 25, 1943, Serial No. 507,635

4 Claims. (Cl. 175—363)

My invention relates to a converter system and more particularly one of a type utilizing magnetic circuits.

Among the objects of my invention are:

1. To provide a converter system of the magnetic type having very low hysteresis loss.

2. To provide a converter system of the magnetic type capable of satisfying rather heavy power requirements.

3. To provide a converter system of the magnetic type capable of handling current of the order of several hundred amperes.

4. To provide a converter system of the magnetic type capable of realizing practical magnetic saturation with relatively small permanent type magnets.

Additional objects of my invention will be brought out in the following description of a preferred embodiment of the same, taken in conjunction with the accompanying drawing wherein the figure is illustrative of one form of system embodying the principles of my invention, and adapted for full wave rectification.

A description of the full wave circuit illustrated in the drawing will also serve to show how my invention may be utilized for half-way rectification if desired.

Referring to the drawing, I provide a pair of similar magnetic circuits in the form of closed cores 3 of conventional transformer core material such as laminations of silicon steel. Each of these cores has disposed thereon, a pair of similar windings 5 and 7. Intermediate the windings and dividing the core into two like halves is a middle leg 9 formed of laminated material, preferably of the type known as permalloy. This leg is preferably pressed into position with insulating shims 11 of non-magnetic material between the ends of this leg and the engaged portions of the core. The thickness of the shims is such as to provide a spacing of the order of five-thousandths of an inch at each end of the leg.

To each of two opposed sides of the leg, I attach a permanent magnet 13, preferably of the horseshoe type, with like poles facing each other. The relative dimensions of the leg 9 and magnets 13 are such as to normally produce a saturating magnetic field in the leg in the absence of any other factors.

Windings 5 and 7 on each core, are connected in opposite polarity and in series with the windings on the other core, across the secondary 15 of a power transformer 17, the primary 19 of which is fed from an alternating current source 21. Between the midpoint 23 of the secondary winding of the transformer and a point on the connection joining the windings of the two cores, I provide a common return connection 25 and in this common return connection, the direct current load 27 is connected.

The principles underlying the operation of my invention may best be understood by considering what takes place in connection with the cores and their associated components for each half cycle of alternating current voltage impressed across the windings of each core of the system.

The permanent magnets 13, in the absence of alternating current flowing through the windings, set up a powerful localized magnetic field in the leg 9 which, as previously indicated, is sufficient to saturate the leg. Practically none of the flux developed by the permanent magnets will seek a path through the core under these conditions because of the increased length of such path and the high reluctance offered by the gap at each end of the leg.

Assume a half cycle of alternating current voltage is applied to the windings of the upper core of the system, as illustrated in the drawing, and that this half cycle of voltage starts current flowing which tends to develop flux in the direction of the solid arrows associated with these windings. The windings 5 and 7 being connected in opposite polarity, will naturally tend to set up flux in opposing directions.

When the directions are such as are indicated in the drawing by the solid arrows, the natural tendency would be for the core flux to pass through the leg 9 and complete a magnetic circuit for each winding. However, partly by reason of the shims 11, which are the equivalent of air gaps, and more particularly because of the fact that the leg 9 is magnetically saturated by the permanent magnets 13, the flux cannot get through, and, accordingly, the flux from one winding will block out or neutralize the flux from the other in the core. Under these conditions, the reactance of the windings will be practically zero. Consequently, the only impedance to the flow of current through the windings will be the direct current resistance of the windings and, accordingly, maximum current will flow during this particular half cycle under consideration.

With respect to the lower core and its associated components during the same half cycle, the direction of current through the windings will be reversed from that obtaining in the windings associated with the upper core. The windings will, accordingly, tend to set up flux in the reverse directions from those existing in the upper core, and these directions have been indicated by solid arrows on the lower core. It is noted that these fluxes, like in the upper core, still oppose each other, but in the opposite direction. Under these conditions, the tendency of the core flux of each winding to complete a magnetic circuit through the leg 9 will oppose the saturating field of the magnets 13 and force the flux of the magnets to seek a lower reluctance path through the core 3.

By such opposition, the saturated condition of the leg 9 is destroyed, thus permitting a substantially complete path of magnetic material for each winding, whereby the reactance increases to a maximum, and, consequently, the impedance to the flow of current through the windings will become maximum. Thus, substantially no current gets through.

In the common return or load circuit, during the half cycle period under consideration, will appear only the rectified half cycle passed by the windings of the upper core. During the reverse half cycle of impressed voltage which follows, conditions in both cores and associated windings will be reversed from that shown in the drawing, and the windings of the lower core will pass the rectified half cycle. Full wave rectification will, therefore, be realized in the load circuit.

Due to the fact that the changes in the field of the permanent magnets are of minor nature as the alternating current voltages are impressed upon the windings 5 and 7 of each core, hysteresis losses in the permanent magnets 13 will be of negligible value.

The system described is capable of handling relatively heavy power loads because of the fact that the permanent magnets are not parts of the closed magnetic core on which the windings are disposed.

From the description of the full wave system illustrated in the drawing, it will become apparent that half-wave rectification may be realized by leaving out either one of the cores and associated windings, etc., from the system.

While I have disclosed a preferred form of my invention in detail, it will be apparent that the same may be altered or modified by one skilled in the art, without departing from the underlying principles of my invention, and, accordingly, I do not desire to be limited in my protection to the specific details of the system disclosed except as may be necessitated by the appended claims.

I claim:

1. A converter system comprising a core of magnetic material forming a substantially closed loop, a pair of windings on said core adapted to be energized in opposite polarity from a source of alternating current, a leg of magnetic material extending across said loop between said windings to form a pair of magnetic paths, each linking with one of said windings, and means for localizing to the substantial exclusion of said core, a unidirectional flux in said leg sufficient to substantially saturate the same in the absence of other factors.

2. A converter system comprising a closed core of magnetic material, a pair of windings on said core adapted to be energized in opposite polarity from a source of alternating current, a leg of magnetic material extending across said core between said windings to form a pair of magnetic paths, each linking with one of said windings, said leg being spaced slightly from said core to provide the equivalent of an air gap in each of said paths, and means for localizing a unidirectional flux in said leg sufficient to saturate the same in the absence of other factors.

3. A converter system comprising a core of magnetic material forming a substantially closed loop, a pair of windings on said core adapted to be energized in opposite phase polarity from a source of alternating current, a leg of magnetic material extending across said loop between said windings to form a pair of magnetic paths, each linking with one of said windings, and permanent magnet means attached to said leg for localizing a unidirectional flux in said leg sufficient to saturate the same in the absence of other factors.

4. A converter system comprising a source of alternating current, a pair of cores of magnetic material, a pair of windings on each of said cores adapted to be energized in opposite polarity from a source of alternating current, a leg of magnetic material extending across each of said cores between the windings thereon to form a pair of magnetic paths, each linking with one of said windings, means for localizing a unidirectional flux in each of said legs sufficient to saturate the same in the absence of other factors, and means connecting the windings of one core to said source of alternating current in phase opposition to the windings of the other core.

PHILIP JOHN WALSH.

REFERENCES CITED

The following references are of record in the file of this patent:

UNITED STATES PATENTS

| Number | Name | Date |
| --- | --- | --- |
| 1,857,160 | McEachron | May 10, 1932 |
| 2,199,121 | Walsh | Apr. 30, 1940 |
| 2,066,919 | West | Jan. 5, 1937 |
| 2,067,143 | Logan | Jan. 5, 1937 |
| 1,668,711 | Evans | May 8, 1928 |